United States Patent
Vaughn et al.

(10) Patent No.: US 9,381,483 B2
(45) Date of Patent: Jul. 5, 2016

(54) POLYCRYSTALLINE DIAMOND COMPACTS HAVING IMPROVED WEAR CHARACTERISTICS, AND METHOD OF MAKING THE SAME

(71) Applicant: Diamond Innovations, Inc., Worthington, OH (US)

(72) Inventors: Joel Michael Vaughn, Groveport, OH (US); Steven W. Webb, Woodlands, TX (US)

(73) Assignee: Diamond Innovations, Inc., Worthington, OH (US)

( * ) Notice: Subject to any disclaimer, the term of this patent is extended or adjusted under 35 U.S.C. 154(b) by 504 days.

(21) Appl. No.: 13/624,218

(22) Filed: Sep. 21, 2012

(65) Prior Publication Data

US 2013/0067826 A1    Mar. 21, 2013

Related U.S. Application Data

(60) Provisional application No. 61/537,369, filed on Sep. 21, 2011.

(51) Int. Cl.

| | |
|---|---|
| *B01J 3/06* | (2006.01) |
| *C22C 26/00* | (2006.01) |
| *C04B 35/52* | (2006.01) |
| *C04B 35/626* | (2006.01) |

(52) U.S. Cl.
CPC ............... *B01J 3/062* (2013.01); *C04B 35/52* (2013.01); *C04B 35/6265* (2013.01); *C22C 26/00* (2013.01); *B01J 2203/062* (2013.01); *B01J 2203/0655* (2013.01); *B01J 2203/0685* (2013.01); *B22F 2998/10* (2013.01); *B22F 2999/00* (2013.01); *C04B 2235/427* (2013.01); *C04B 2235/658* (2013.01); *C04B 2235/6567* (2013.01); *C04B 2235/6582* (2013.01); *C04B 2235/6583* (2013.01); *C04B 2235/722* (2013.01); *C04B 2235/723* (2013.01)

(58) Field of Classification Search
CPC ........ C09K 3/14; B01J 3/06; B01J 2203/068; B01J 2203/0655
See application file for complete search history.

(56) References Cited

U.S. PATENT DOCUMENTS

| | | | |
|---|---|---|---|
| 5,151,107 A | 9/1992 | Chen | |
| 5,194,070 A * | 3/1993 | Sumiya et al. | 51/293 |
| 6,676,893 B2 | 1/2004 | Rolander | |
| 7,172,142 B2 | 2/2007 | Taylor et al. | |
| 2007/0056778 A1 | 3/2007 | Webb | |
| 2008/0073126 A1 * | 3/2008 | Shen et al. | 175/434 |
| 2008/0194084 A1 * | 8/2008 | Kononchuk et al. | 438/488 |
| 2009/0260877 A1 * | 10/2009 | Wirth | 175/40 |

FOREIGN PATENT DOCUMENTS

| | | |
|---|---|---|
| GB | 1115649 A | 5/1968 |
| JP | 8301610 A | 11/1996 |
| WO | 0231078 A2 | 4/2002 |
| WO | 2004111284 A2 | 12/2004 |
| WO | 2007147214 A1 | 12/2007 |

* cited by examiner

*Primary Examiner* — Pegah Parvini

(57) ABSTRACT

A method of making a polycrystalline diamond compact includes mixing a diamond particle feed with a binder to form a mixture, forming the mixture into a precompact, heating the pre-compact in a non-oxidizing atmosphere to substantially drive off the binder, oxidizing the pre-compact in an oxidizing atmosphere at a temperature and for a time sufficient to burn off non-diamond carbon without overoxidizing diamond, and sintering the pre-compact at high pressure and high temperature to form a polycrystalline diamond compact. The method may also include oxidizing the diamond particle feed prior to mixing with the binder.

11 Claims, 5 Drawing Sheets

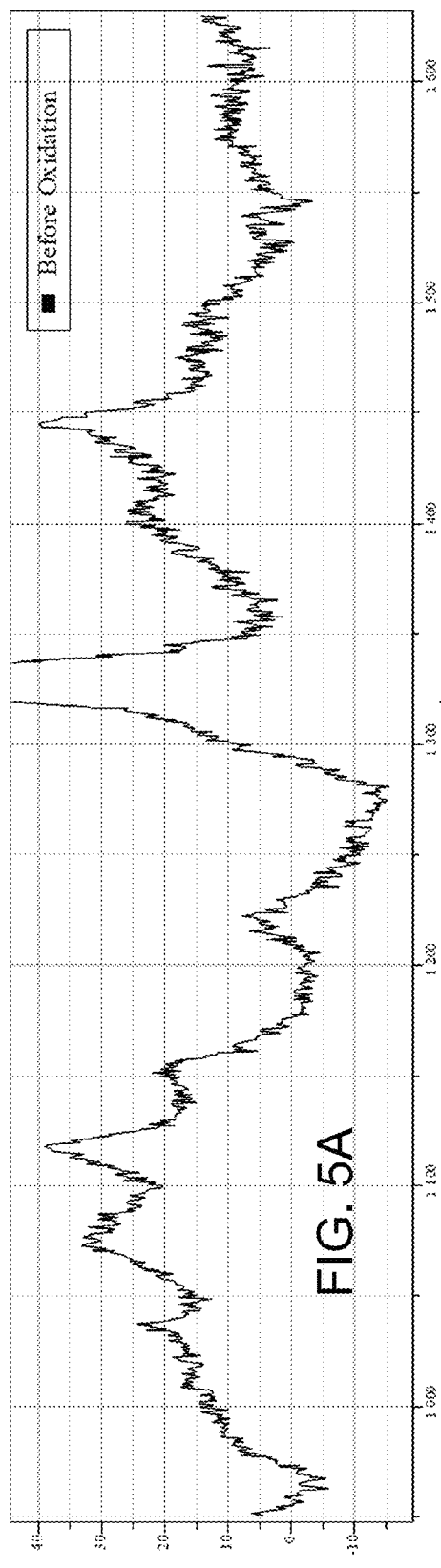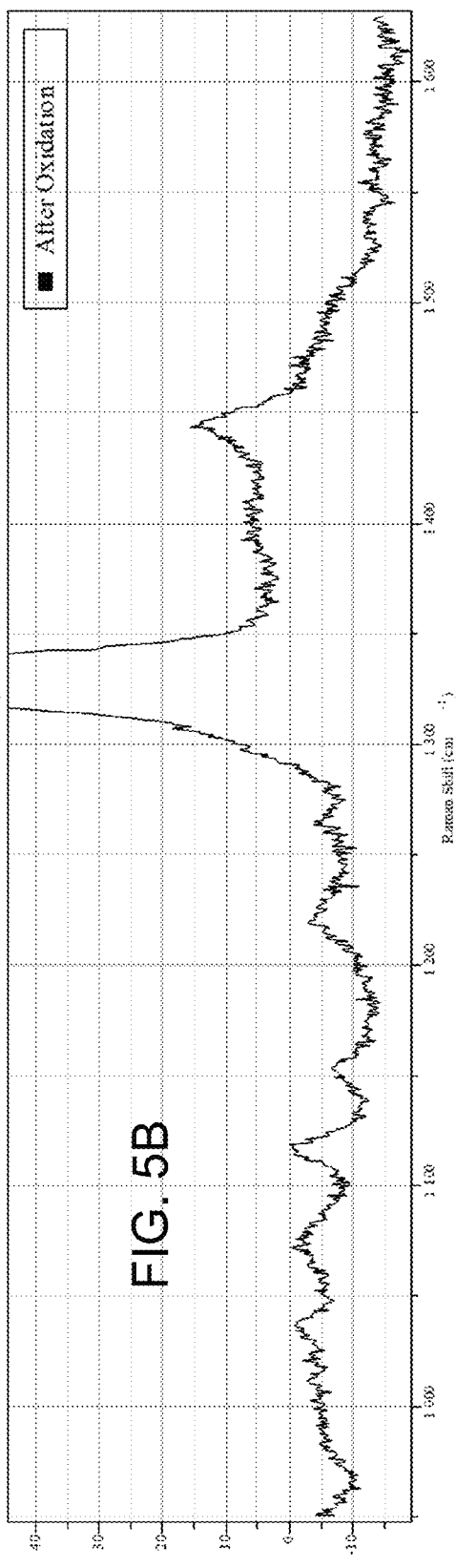

POLYCRYSTALLINE DIAMOND COMPACTS HAVING IMPROVED WEAR CHARACTERISTICS, AND METHOD OF MAKING THE SAME

CROSS-REFERENCE TO RELATED APPLICATIONS

The present application claims priority to U.S. Provisional Application Ser. No. 61/537,369, filed on Sep. 21, 2011, the entire contents of which are hereby incorporated by reference in its entirety.

BACKGROUND

A PCD compact is formed by sintering individual diamond particles together under high pressure and high temperature (HPHT) conditions. Sintering is commonly done in the presence of a catalyst, such as cobalt, which promotes diamond-to-diamond bonding.

In general, a compact may be characterized generally as an integrally bonded structure formed of a sintered, polycrystalline mass of abrasive particles, such as diamond or CBN. Although such compacts may be self-bonded without the aid of a bonding matrix or second phase, suitable bonding matrixes include metals such as cobalt, iron, nickel, platinum, titanium, chromium, tantalum, or an alloy or mixture thereof. The bonding matrix, which is provided at from about 5% to about 30% by volume, additionally may contain a recrystallization or growth catalyst such as aluminum for CBN or cobalt for diamond.

The basic HPHT method for manufacturing polycrystalline compacts entails placing an unsintered body of abrasive, crystalline particles, such as diamond or CBN, or a mixture thereof, within a cup which is disposed within the reaction cell of a HPHT apparatus. Additionally placed in the enclosure with the abrasive particles may be a metal catalyst if the sintering of diamond particles is contemplated, as well as a pre-formed body of a cemented metal carbide for supporting the abrasive particles and to thereby form a supported compact therewith. Alternatively, catalyst may migrate or be swept into the matrix of abrasive particles before and/or during sintering. The contents of the cell then are subjected to processing conditions selected as sufficient to affect intercrystalline bonding between adjacent grains of the abrasive particles and, optionally, the joining of the sintered particles to the cemented metal carbide substrate or support. Such processing conditions generally involve the imposition for about 3 to about 120 minutes of a temperature of at least about 1200° C. and a pressure of at least about 20 kbar, and typically at pressures above about 40 kbar and at temperatures from about 1200° C. to about 2000° C.

As to the sintering of polycrystalline diamond compacts, the catalyst metal may be provided in a pre-consolidated form disposed adjacent the crystal particles. For example, the metal catalyst may be configured as an annulus into which is received a cylinder of abrasive crystal particles, or as a disc which is disposed above or below the crystalline mass. Alternatively, the metal catalyst, or solvent as it is also known, may be provided in a powdered form and intermixed with the abrasive crystalline particles, or as a cemented metal carbide or carbide molding powder which may be cold pressed in to shape and wherein the cementing agent is provided as a catalyst or solvent for diamond recrystallization or growth. Typically, the metal catalyst or solvent is selected from cobalt, iron, or nickel, or an alloy or mixture thereof, but other metals such as ruthenium, rhodium, palladium, chromium, manganese, tantalum, and alloys and mixtures thereof also may be employed.

SUMMARY

Disclosed herein is a method of preparing an oxidized diamond particle feed, the method comprising oxidizing a quantity of diamond particle feed in an oxidizing atmosphere at a temperature and for a time sufficient to burn off non-diamond carbon without over-oxidizing diamond. Also disclosed herein is an oxidized diamond particle feed made according to the method.

Disclosed herein is a method of preparing an oxidized pre-compact, the method comprising mixing a diamond particle feed with a binder to form a mixture, forming the mixture into a pre-compact, oxidizing a pre-compact in an oxidizing atmosphere at a temperature and for a time sufficient to burn off non-diamond carbon without over-oxidizing diamond. Also disclosed herein is an oxidized pre-compact made according to the method.

Disclosed herein is a method of preparing an oxidized pre-compact assembly, the method comprising mixing a diamond particle feed with a binder to form a mixture, forming the mixture into a pre-compact, placing the pre-compact in a cup of a high pressure, high temperature apparatus to form a pre-compact assembly, oxidizing a pre-compact assembly in an oxidizing atmosphere at a temperature and for a time sufficient to burn off non-diamond carbon without over-oxidizing diamond. Also disclosed herein is an oxidized pre-compact assembly.

Disclosed herein is a method of making a polycrystalline diamond compact, comprising mixing a diamond particle feed with a binder to form a mixture, forming the mixture into a pre-compact, heating the pre-compact in a non-oxidizing atmosphere to substantially drive off the binder, oxidizing the pre-compact in an oxidizing atmosphere at a temperature and for a time sufficient to burn off non-diamond carbon without over-oxidizing diamond, and sintering the pre-compact at high pressure and high temperature to form a polycrystalline diamond compact. In an embodiment, the diamond is over-oxidized. In an aspect, over-oxidized diamond is characterized, at least in part, by a measurable weight loss as compared to the diamond prior to oxidation. In some embodiments, the pre-compact is placed in a cup of a high pressure, high temperature apparatus prior to heating the pre-compact. In some embodiments, the diamond particle feed is oxidized prior to mixing with the binder.

In some embodiments, the non-oxidizing atmosphere is composed primarily of hydrogen. In some embodiments, the non-oxidizing atmosphere is composed primarily of argon.

In some embodiments, the oxidizing atmosphere is composed primarily of air.

In some embodiments, the pre-compact is oxidized at a temperature from about 500° C. to about 750° C. and for a time from about 10 minutes to about 240 minutes.

Also disclosed herein is a method of removing non-diamond carbon from a pre-compact prior to sintering, comprising heating the pre-compact in an oxidizing atmosphere at a temperature from about 500° C. to about 750° C., for a time from about 10 minutes to about 240 minutes, wherein the pre-compact is located in a cup of a high pressure, high temperature apparatus during the heating. In some embodiments, the oxidizing atmosphere is composed primarily of air.

Also disclosed herein is a polycrystalline diamond compact having improved wear characteristics made by a process comprising mixing a diamond particle feed with a binder to form a mixture, forming the mixture into a pre-compact, heating the pre-compact in a non-oxidizing atmosphere to substantially drive off the binder, oxidizing the pre-compact in an oxidizing atmosphere at a temperature and for a time sufficient to burn off non-diamond carbon without over-oxidizing diamond, sintering the pre-compact at high pressure and high temperature to form a polycrystalline diamond compact.

Also disclosed herein is a method of making a polycrystalline diamond compact, comprising oxidizing a diamond particle feed in an oxidizing atmosphere at a temperature and for a time sufficient to burn off non-diamond carbon without over-oxidizing diamond, mixing the diamond particle feed with a binder to form a mixture, forming the mixture into a pre-compact, heating the pre-compact in a non-oxidizing atmosphere to substantially drive off the binder, and sintering the pre-compact at high pressure and high temperature to form a polycrystalline diamond compact. Also disclosed is a polycrystalline diamond compact made according to the method.

Also disclosed herein is a method of making a polycrystalline diamond compact, comprising mixing a diamond particle feed with a binder to form a mixture, forming the mixture into a pre-compact, heating the pre-compact in an oxidizing atmosphere at a temperature and for a time sufficient to burn off non-diamond carbon without over-oxidizing diamond, and sintering the pre-compact at high pressure and high temperature to form a polycrystalline diamond compact. Also disclosed is a polycrystalline diamond compact made according to the method.

Also disclosed is a polycrystalline diamond compact having improved wear characteristics, the polycrystalline diamond compact based on a pre-compact comprising a diamond particle feed and a binder, the pre-compact or diamond particle feed characterized in that the Raman spectrum of the pre-compact and/or the diamond particle feed is substantially free of peaks indicative of non-diamond carbon, wherein the Raman spectrum is produced using a laser excitation wavelength selected from the group consisting of 532 nm, 623 nm, and 785 nm.

Also disclosed is a polycrystalline diamond compact having improved wear characteristics, the polycrystalline diamond compact based on a pre-compact comprising a diamond particle feed and a binder, the pre-compact characterized in that the Raman spectrum of the pre-compact is substantially free of peaks indicative of non-diamond carbon.

Also disclosed is a polycrystalline diamond compact having improved wear characteristics, the polycrystalline diamond compact based on a pre-compact comprising a diamond particle feed and a binder, the diamond particle feed characterized in that the Raman spectrum of the diamond particle feed is substantially free of peaks indicative of non-diamond carbon.

Also disclosed herein is a polycrystalline diamond compact having improved wear characteristics, the polycrystalline diamond compact characterized in that the ratio of oxygen to nitrogen for the polycrystalline diamond compact is at least 1.2:1. Also disclosed herein is a polycrystalline diamond compact having improved wear characteristics, the polycrystalline diamond compact characterized in that the ratio of oxygen to nitrogen for a pre-compact used to prepare the compact is at least 1.2:1. Also disclosed herein is a polycrystalline diamond compact having improved wear characteristics, the polycrystalline diamond compact characterized in that the ratio of oxygen to nitrogen for the diamond feed used to prepare the compact is at least 1.2:1.

Also disclosed herein is a method of making a polycrystalline diamond compact, comprising mixing a diamond particle feed with a binder to form a mixture, forming the mixture into a pre-compact, heating the pre-compact in a non-oxidizing atmosphere to substantially drive off the binder, oxidizing the pre-compact in an oxidizing atmosphere at a temperature and for a time sufficient to burn off non-diamond carbon without over-oxidizing diamond, sintering the pre-compact at high pressure and high temperature to form a polycrystalline diamond compact, wherein the polycrystalline diamond compact is characterized in that the ratio of oxygen to nitrogen for the polycrystalline diamond compact, in parts per million, is at least 1.2:1. Also disclosed herein is a method of making a polycrystalline diamond compact wherein the polycrystalline diamond compact is characterized in that the ratio of oxygen to nitrogen for a pre-compact used to prepare the compact is at least 1.2:1. Also disclosed herein is a method of making a polycrystalline diamond compact wherein the polycrystalline diamond compact is characterized in that the ratio of oxygen to nitrogen for the diamond feed used to prepare the compact is at least 1.2:1.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

FIG. 5, comprising FIGS. 5A and 5B, is a Raman spectrum illustrating the difference between oxidized diamond feed and non-oxidized diamond feed, specifically showing a reduction in the 1580 peak ("graphite peak", non-diamond carbon) in the oxidized spectrum. Spectra were generated using a 785 nm laser.

DETAILED DESCRIPTION OF THE EMBODIMENTS

Figure 1:
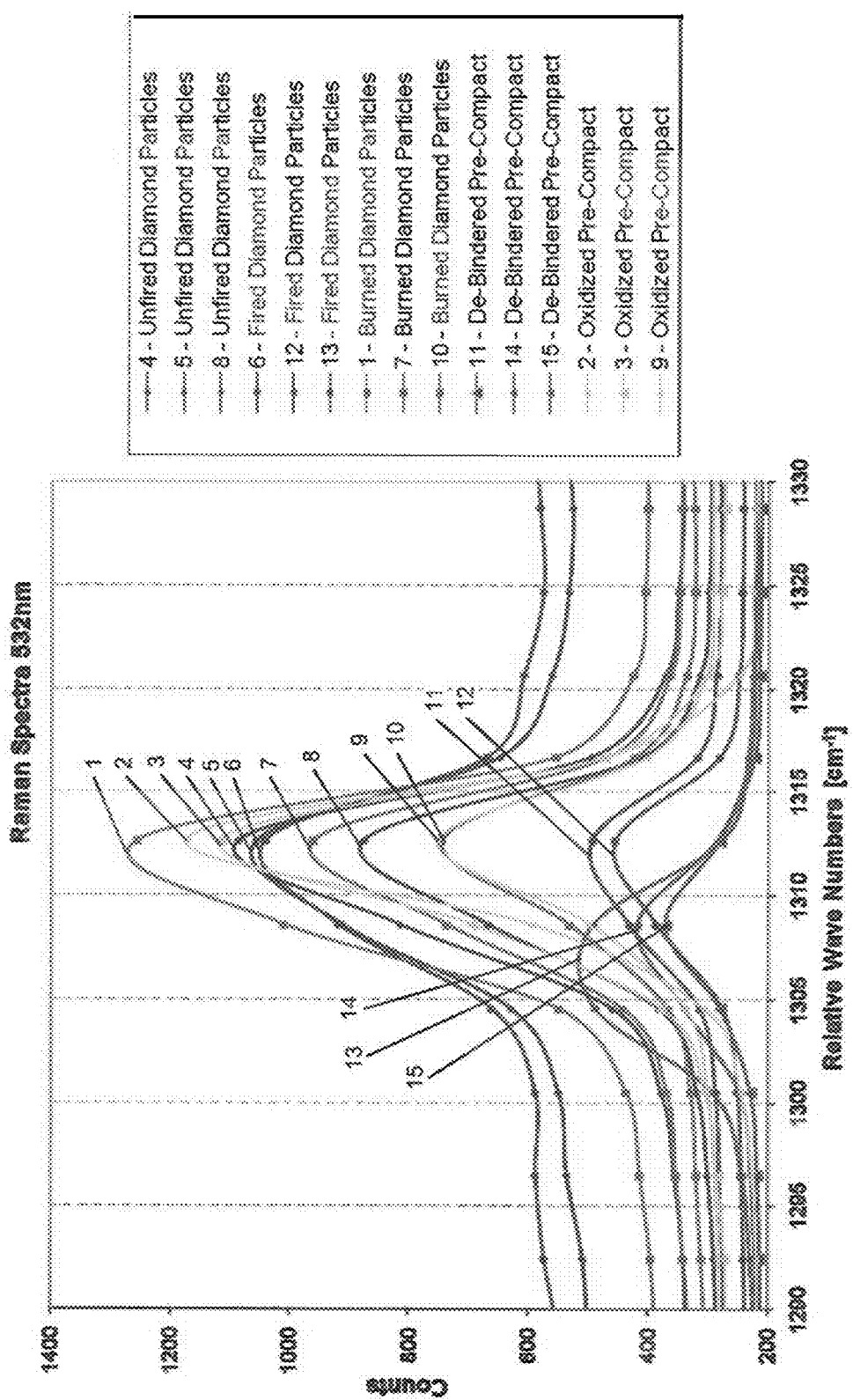
FIG. 1 is a graph showing the Raman Spectra of several diamond feeds, and comparing diamond particle feeds that were unfired, fired (in a reducing atmosphere), burned (in an oxidizing atmosphere) with diamond feeds from pre-compacts that were debindered, removed of binder, (in a reducing atmosphere) and burned.

The present disclosure relates to polycrystalline diamond (PCD) compacts made under high pressure, high temperature (HPHT) processing conditions, and specifically to PCD compacts having improved chipping resistance and wear resistance.

The term "compact", as used herein, refers to a sintered product made using a diamond feed. The term "diamond feed" or "diamond particle feed", as used herein, refers to a source of diamond for the methods and compositions of the present disclosure.

Under the specified HPHT conditions, a metal catalyst, in whatever form provided, is caused to penetrate or "sweep" into an abrasive layer by means of either diffusion or capillary action, and is thereby made available as a catalyst or solvent for recrystallization or crystal intergrowth. The HPHT conditions, which operate in the diamond stable thermodynamic region above the equilibrium between diamond and graphite phases, effect a compaction of the abrasive crystal particles which is characterized by intercrystalline diamond-to-diamond bonding wherein parts of each crystalline lattice are shared between adjacent crystal grains. Preferably, the diamond concentration in the compact or in the abrasive table of the supported compact is at least about 70% by volume.

In various embodiments, composite polycrystalline abrasive elements made from diamond powder are often formed into compacts that are widely used in industry as cutting elements. In an embodiment, a diamond particle feed is typically mixed with a binder and pre-compacted. In an embodiment, a polycrystalline diamond compact is subsequently made from the pre-compacted mixture, also referred to herein as a "pre-compact". In an embodiment, such a polycrystalline diamond compact is also said to be "based on" the pre-compact. It should be understood that the disclosure encompassed herein, including the methods and compositions encompassed herein, applies with equal force to diamond feeds, pre-compacts, and compacts. It should also be understood that each of the components encompassed herein may be processed and/or used according to the methods set forth herein and independently of one another.

In an embodiment, a common binder is PEG (polyethylene glycol), although other equivalently functioning binders can be used. Other suitable binders include, but are not limited to, paraffin wax. Furthermore, suitable binders can be found in U.S. Pat. No. 6,676,893, which patent is hereby incorporated by reference herein in its entirety. In part, the binder ensures that the diamond particles are distributed with a uniform density, and holds the diamond particles together. However, the presence of binder can impede the ensuing sintering process, as well as the sweep process (if required for the particular compact being made).

Disclosed herein are embodiments comprising processes for removing non-diamond carbon from a de-bindered pre-compact while maintaining the uniform distribution of diamond particles in the pre-compact. In an embodiment, to remove binder prior to the sweep and sintering processes, a precompacted body ("pre-compact") is fired or heated in a reducing environment (such as hydrogen) or a neutral environment (such as argon). In an embodiment, the non-oxidizing atmosphere is an inert atmosphere. In an embodiment, the non-oxidizing atmosphere may be composed primarily of hydrogen, argon, nitrogen, helium, or any combination thereof. This process is also referred to herein as "de-bindering". In an embodiment, a process that may be used to form a pre-compacted body is disclosed in U.S. Pat. No. 6,676,893, which patent is hereby incorporated by reference herein in its entirety. It should be noted that the pCBN mixture taught in U.S. Pat. No. 6,676,893 would be substituted for the diamond feed (including binder) of the embodiments of the present disclosure. In an embodiment, after de-bindering, the resultant pre-compact still retains sufficient strength and coherence that it can be transferred and loaded into a cup assembly of an HPHT apparatus. However, as a result of the heating process, the binder leaves behind carbon in a form that is not diamond. While this residual non-diamond carbon may help the pre-compact retain some strength after firing, it hinders sweep and sintering.

Encompassed herein are diamond particle feeds, pre-compacts comprising diamond particle feeds, pre-compact assemblies comprising diamond particle feeds, and compacts comprising diamond particle feeds, as well as methods of making and characterizing such compositions.

Diamond Particle Feeds

Embodiments encompassed herein comprise a process that can be used to remove carbon from diamond particle feed. For example, it is known that when diamond particle feed is fired for too long, and/or at too high a temperature, significant non-diamond carbon can form, and it is likely that some non-diamond carbon is even present in small quantities after a normal heating process.

In an embodiment, the diamond particle feed can also be fired in an oxidizing atmosphere to remove any contaminating non-diamond carbon that would not otherwise be removed under standard (non-oxidizing) heating processes. In an embodiment, firing in an oxidizing atmosphere does not change the particle size distribution of the diamond. In an embodiment, firing in an oxidizing atmosphere can also reduce the hydrogen termination on the diamond, and may terminate the surface with nitrogen and oxygen. In an embodiment, firing in an oxidizing atmosphere can also reduce the hydrogen termination on the substrate, and may terminate the surface with nitrogen and oxygen.

In an embodiment, a diamond particle feed is oxidized. In an embodiment, a diamond particle feed is oxidized outside of a cup of an HPHT system. In an embodiment, a diamond particle feed is oxidized in a cup of an HPHT system. In an embodiment, a diamond particle feed is oxidized in a cup of an HPHT system, wherein the cup does not comprise a substrate for the diamond particle feed during the oxidation process. In an embodiment, a diamond particle feed is oxidized in a cup of an HPHT system, wherein the cup further comprises at least one substrate for the diamond particle feed during the oxidation process.

In an embodiment, a method is provided comprising oxidation of a diamond particle feed and preparation of a pre-compact using the oxidized diamond particle feed. In an embodiment, a method is provided comprising oxidation of a diamond particle feed and preparation of a pre-compact using the oxidized diamond particle feed, followed by oxidation of the pre-compact formed with the oxidized diamond particle feed. In an embodiment, the pre-compact may optionally be de-bindered.

In an embodiment of a method of making a polycrystalline diamond compact, a diamond particle feed is mixed with a binder to form a mixture, and the mixture is formed into a pre-compact. In an embodiment, the diamond particle feed is oxidized prior to mixing with the binder. In an embodiment, a method is provided comprising oxidation of a diamond particle feed and preparation of a pre-compact using the oxidized diamond particle feed, followed by oxidation of the pre-compact formed with the oxidized diamond particle feed. In an embodiment, the diamond particle feed and/or the pre-compact can be oxidized at a temperature of about 500° C. to about 750° C. for a time of about a few minutes to about several hours. Temperature and/or time may be varied as described in detail elsewhere herein.

Pre-Compact Compositions

In an embodiment, the pre-compact may optionally be de-bindered prior to oxidation. In an embodiment, a process for oxidizing a debindered pre-compact is described herein.

In an embodiment, the pre-compact may optionally be de-bindered in an oxidizing environment, as described in detail elsewhere herein. In another embodiment, a method is provided for oxidizing a pre-compact. In an embodiment, the pre-compact may optionally be de-bindered in an oxidizing environment in a cup, as described in detail elsewhere herein. In an embodiment, a method is provided for oxidizing a pre-compact that has already been de-bindered by heating in a reducing or neutral atmosphere. In an embodiment, the pre-compact may optionally be de-bindered in an oxidizing environment in a cup with a carbide substrate, as described in detail elsewhere herein.

In an embodiment, the pre-compact may optionally be located in a cup of a high pressure, high temperature apparatus during the heating. In an embodiment, the pre-compact may optionally first be located in a non-oxidizing atmosphere. In an embodiment, the pre-compact is then oxidized in an oxidizing atmosphere at a temperature and for a time sufficient to burn off non-diamond carbon without over-oxidizing diamond. In an embodiment, the oxidizing environment may be composed primarily of air.

In an embodiment, the pre-compact is first heated in a non-oxidizing atmosphere to substantially drive off the binder.

In another embodiment, non-diamond carbon can be removed from a pre-compact prior to sintering by heating the pre-compact in an oxidizing atmosphere. In an embodiment, the heating can be conducted at a temperature from about 500° C. to about 750° C. and for a time from about 10 minutes to about 240 minutes. In other embodiments, temperature and/or time may be varied as described in detail elsewhere herein. In another embodiment, a pre-compact is heated in an oxidizing atmosphere to substantially drive off the binder.

In an embodiment, the pre-compact is sintered at high pressure and high temperature to form a polycrystalline diamond compact. In an embodiment, the sintered polycrystalline diamond compact is oxidized.

Pre-Compact Assemblies

In an embodiment, an assembly is formed by placing the pre-compact into a container with a suitable substrate material. In an embodiment, the pre-compact is then oxidized in an oxidizing atmosphere at a temperature and for a time sufficient to burn off non-diamond carbon without over-oxidizing the diamond. In an embodiment, the oxidizing atmosphere may be composed primarily of air.

In another embodiment, an assembly is formed by placing the pre-compact into a cup with a carbide substrate or other substrate material, such as, but not limited to diamond composites. In an embodiment, a substrate material is silicon carbide. In an embodiment, the assembly is heated in an oxidizing atmosphere, such as air, at a temperature sufficiently high and for a time sufficiently long to remove non-diamond carbon, but at a temperature sufficiently low and for a time sufficient short as to not over-oxidize the cup and the substrate. In an embodiment, the assembly can be oxidized at a temperature of about 500° C. to about 750° C. for a time of about a few minutes to about several hours. Temperature and/or time may be varied as described in detail elsewhere herein.

Reaction Parameters

The reaction parameters disclosed and encompassed herein apply equally to all compositions and methodologies set forth above and/or encompassed by the present disclosure. One of skill in the art will understand, based on the present disclosure, how and why various reaction parameters can be varied to practice the methods and obtain the compositions encompassed by the present disclosure.

As discussed in detail elsewhere herein, non-diamond carbon may be removed from a pre-compact prior to sintering, non-diamond carbon may be removed from a pre-compact assembly prior to sintering, and non-diamond carbon may be removed from diamond particle feed prior to sintering. In an embodiment, the oxidizing temperature may be from about 500° C. to about 750° C. In an embodiment, oxidizing temperature is about 400° C. to about 900° C., about 450° C. to about 850° C., about 500° C. to about 800° C., about 550° C. to about 750° C., or about 600° C. to about 700° C. In an embodiment, the oxidizing temperature is less than about 400° C., about 400° C., about 450° C., about 500° C., about 550° C., about 600° C., about 650° C., about 700° C., about 750° C., about 800° C., about 850° C., about 900° C., about 950° C., about 1000° C., or greater than about 1000° C.

In an embodiment, the oxidizing time is from about 10 minutes to about 240 minutes, or in some cases longer than about 240 minutes. In an embodiment, the oxidizing time is less than about 10 minutes. In an embodiment, the oxidizing time is about one minute to about 24 hours. In an embodiment, the oxidizing time is from about five minutes to about 22 hours, from about 10 minutes to about 20 hours, from about 20 minutes to about 18 hours, from about 30 minutes to about 15 hours, from about 30 minutes to about 10 hours, from about 45 minutes to about 8 hours, from about one hour to about 5 hours, from about two hours to about four hours. In an embodiment, the oxidizing time is less than about one minute, about one minute, about five minutes, about 10 minutes, about 15 minutes, about 20 minutes, about 30 minutes, about 45 minutes, about 60 minutes, about 75 minutes, about 90 minutes, about 120 minutes, or greater than about 120 minutes. In an embodiment, the oxidizing time is less than about one hour, about one hour, about two hours, about three hours, about four hours, about five hours, about six hours, about seven hours, about eight hours, about nine hours, about 10 hours, or greater than about 10 hours.

In an embodiment, an oxidizing environment may be air. In an embodiment, an oxidizing environment comprises oxygen. In an embodiment, an oxidizing environment comprises oxygen and at least one additional inert gas. In an embodiment, an oxidizing environment comprises oxygen and nitrogen. In an embodiment, an oxidizing environment consists of oxygen and nitrogen. In an embodiment, an oxidizing environment may comprise less than about 1% oxygen. In an embodiment, an oxidizing environment may comprise at least about 1% oxygen, at least about 2% oxygen, at least about 3% oxygen, at least about 4% oxygen, at least about 5% oxygen, at least about 10% oxygen, at least about 15% oxygen, at least about 20% oxygen, at least about 21% oxygen. In an embodiment, an oxidizing environment may comprise greater than 21% oxygen, e.g., at least about 30% oxygen, at least about 35% oxygen, at least about 40% oxygen, or more.

In an embodiment, the oxidizing time is not dependent upon the concentration of oxygen in the oxidizing environment. In an embodiment, the oxidizing time is dependent upon the concentration of oxygen in the oxidizing environment. In an embodiment, the oxidizing time is decreased and the concentration of oxygen in the oxidizing environment is increased to obtain a desired degree of oxidation. In an embodiment, the oxidizing time is increased and the concentration of oxygen in the oxidizing environment is decreased to obtain a desired degree of oxidation.

Characterization of Products

In an aspect, a composition made according to the methods herein may be characterized using one or more types of spectroscopy. In an embodiment, a composition made according to the methods herein is characterized using Raman spectroscopy.

In an embodiment, a Raman spectroscopic peak is generated using an excitatory laser having a wavelength of 532 nm. In an embodiment, a Raman spectroscopic peak is generated using an excitatory laser having a wavelength of 785 nm. In an embodiment, a Raman spectroscopic peak is generated using an excitatory laser having a wavelength of 623 nm. It will be understood that any suitable wavelength of excitatory energy may be used, provided that the wavelength selected can provide information regarding non-diamond carbon and/or carbon that exists as part of diamond material. In an embodiment, Raman spectroscopic peaks between about 1300 $cm^{-1}$ and about 1320 $cm^{-1}$ are indicative of carbon that exists as part of diamond material. In an embodiment, Raman spectroscopic peaks at about 1580 $cm^{-1}$ and/or at about 1250 $cm^{-1}$ are indicative of non-diamond carbon, carbon that does not exist as part of diamond material.

In an embodiment, reduction of a peak at about 1580 $cm^{-1}$ for a sample after processing according to the disclosure encompassed herein as compared to the peak at about 1580 $cm^{-1}$ for the same sample prior to processing is indicative of composition made according the present disclosure. In an aspect, reduction of a peak at about 1580 $cm^{-1}$ for a sample after processing according to the disclosure encompassed herein as compared to the peak at about 1580 $cm^{-1}$ for the same sample prior to processing is indicative of a reduction in non-diamond carbon, as described in greater detail elsewhere herein.

In an embodiment, Raman peaks may be used to compare the characteristics of two or more samples (e.g., peaks arising due to carbon within a diamond structure vs. peaks arising due to carbon that is not within a diamond structure). In an embodiment, the size or intensity of a Raman spectroscopic peak can be correlated with the relative abundance of a particular species giving rise to that spectroscopic peak. However, one of skill in the art will understand that intensity or size of a Raman peak can vary among different sets of data, on different instrumentation, and based on the sample being analyzed. Therefore, the methods and compositions encompassed herein should be viewed while taking into account such variability, and any required standardization and corrections should be applied prior to analysis of Raman data obtained in accordance with the disclosure encompassed herein.

In an embodiment, a sample that is prepared according to a method set forth herein has a lower non-diamond carbon peak than the sample prior to preparation according to the method. In an embodiment, a diamond feed that is oxidized according to a method encompassed herein has a lower non-diamond carbon peak than the diamond feed prior to oxidation. In an embodiment, a pre-compact that is oxidized according to a method encompassed herein has a lower non-diamond carbon peak than the pre-compact prior to oxidation. In an embodiment, a compact that is oxidized according to a method encompassed herein has a lower non-diamond carbon peak than the compact prior to oxidation. In an embodiment, a sample has a non-diamond carbon peak lower than the non-diamond carbon peak in the sample prior to oxidation or burning according a method encompassed herein. Non-limiting examples of such samples include a diamond feed, a pre-compact, a compact, a substrate, or an assembly.

In an embodiment, a method is provided for making a polycrystalline diamond compact having improved wear characteristics, the polycrystalline diamond compact based on a pre-compact comprising a diamond particle feed and a binder, the pre-compact characterized in that the Raman spectrum of the pre-compact is substantially free of peaks indicative of non-diamond carbon. In an embodiment, a method is provided for making a polycrystalline diamond compact having improved wear characteristics, the polycrystalline diamond compact based on a pre-compact comprising a diamond particle feed and a binder, the diamond particle feed characterized in that the Raman spectrum of the diamond particle feed is substantially free of peaks indicative of non-diamond carbon.

In an embodiment, the non-diamond carbon peak is reduced by less than about 1% after oxidation or burning. In an embodiment, the non-diamond carbon peak is reduced by at least about 1%, at least about 2%, at least about 3%, at least about 4%, at least about 5%, at least about 7.5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, at least about 99.5%, at least about 99.9%, after oxidation or burning. In an embodiment, the non-diamond carbon peak is reduced by less than 100% after oxidation or burning. In an embodiment, the non-diamond carbon peak is reduced by 100% after oxidation or burning. In an embodiment, a non-diamond carbon peak is eliminated after oxidation or burning.

In another embodiment, the ratio of Raman peaks arising due to carbon within a diamond structure vs. Raman peaks arising due to carbon that is not within a diamond structure, wherein the ratio increases after oxidation or burning, is indicative of a sample prepared according to the methods encompassed herein. In other words, wherein the ratio of Raman peaks arising due to carbon within a diamond structure vs. Raman peaks arising due to carbon that is not within a diamond structure can be represented by Rd/Rf, a sample prepared according to the methods herein has a Rd/Rf "after burning" greater than Rd/Rf "prior to burning". It will be understood, for samples undergoing more than one burning step, that Rd/Rf may increase more than one time, and in an embodiment, may increase after each burning step.

In an embodiment of a method of making a polycrystalline diamond compact encompassed herein, the method comprises mixing a diamond particle feed with a binder to form a mixture, forming the mixture into a pre-compact having a measurable Raman spectrum, heating the pre-compact in a non-oxidizing atmosphere to substantially drive off the binder, oxidizing the pre-compact in an oxidizing atmosphere at a temperature and for a time sufficient to burn off non-diamond carbon without over-oxidizing diamond, and sintering the pre-compact at high pressure and high temperature to form a polycrystalline diamond compact.

In an embodiment of a method of making a polycrystalline diamond compact encompassed herein, the method comprises subjecting a diamond particle feed having a measurable Raman spectrum to an oxidizing atmosphere at a temperature and for a time sufficient to burn off non-diamond carbon without over-oxidizing diamond, mixing the oxidized diamond particle feed with a binder to form a mixture, forming the mixture into a pre-compact, heating the pre-compact in a non-oxidizing atmosphere to substantially drive off the binder, and sintering the pre-compact at high pressure and high temperature to form a polycrystalline diamond compact.

In an embodiment of a method of making a polycrystalline diamond compact encompassed herein, the method comprises mixing a diamond particle feed with a binder to form a mixture, forming the mixture into a pre-compact having a measurable Raman spectrum, heating the pre-compact in a non-oxidizing atmosphere to substantially drive off the binder, sintering the pre-compact at high pressure and high temperature to form a polycrystalline diamond compact, and oxidizing the compact in an oxidizing atmosphere at a temperature and for a time sufficient to burn off non-diamond carbon without over-oxidizing diamond.

In various embodiments, any combination of method steps may be used wherein a diamond particle feed, a pre-compact, and a compact, or any combination of two or more, are optionally oxidized in an oxidizing atmosphere at a temperature and for a time sufficient to burn off non-diamond carbon without over-oxidizing diamond. In other embodiments, a diamond particle feed may be oxidized without production of a pre-compact.

In an embodiment, a polycrystalline diamond compact is provided that is based on a pre-compact comprising a diamond particle feed and a binder, the pre-compact characterized in that the Raman spectrum of the pre-compact produced using a 532 nm laser excitation is substantially free of peaks indicative of non-diamond carbon.

In another embodiment, a polycrystalline diamond compact prepared according to a method encompassed herein is characterized by the oxygen and nitrogen content of the PCD compact. As described in detail elsewhere herein, and in particular, in Example 4, it is shown that PCD compact oxygen content increases and PCD compact nitrogen content decreases for PCD compact prepared from pre-compacts that have undergone oxidation treatment to remove non-diamond carbon. Such oxidation treatment, also referred to herein as "burning", is contemplated. In an embodiment, the disclosure herein provides compositions comprising such a PCD compact.

In an aspect, the oxygen and nitrogen content of a PCD compact can be determined using elemental analysis. One of skill in the art will understand how to select and use methodology and instrumentation useful to detect and quantify nitrogen and oxygen in a PCD compact sample of the present disclosure.

In an embodiment, the ratio of oxygen to nitrogen, in parts per million (ppm), is at least 1.2:1. In an embodiment, the ratio of oxygen to nitrogen, in parts per million (ppm), is at least about 1.2:1, at least about 1.3:1, at least about 1.4:1, at least about 1.5:1, at least about 1.6:1, at least about 1.7:1, at least about 1.75:1, at least about 1.8:1, at least about 1.9:1, at least about 2:1, at least about 2.15:1, at least about 2.5:1, at least about 3:1, at least about 3.47:1, at least about 3.5:1, at least about 3.85:1, at least about 4:1, at least about 4.5:1, at least about 5:1, at least about 6:1, at least about 7:1, at least about 8:1, at least about 9:1, at least about 10:1, at least about 10.61:1, at least about 12:1, at least about 14:1, at least about 16:1, at least about 18:1, at least about 19.25:1, or at least about 20:1.

In an embodiment, the ratio of oxygen to nitrogen, in parts per million (ppm), is or is about 1.2:1, about 1.3:1, about 1.4:1, about 1.5:1, about 1.6:1, about 1.7:1, about 1.75:1, about 1.8:1, about 1.9:1, about 2:1, about 2.15:1, about 2.5:1, about 3:1, about 3.47:1, about 3.5:1, about 3.85:1, about 4:1, about 4.5:1, about 5:1, about 6:1, about 7:1, about 8:1, about 9:1, about 10:1, about 10.61:1, about 12:1, about 14:1, about 16:1, about 18:1, about 19.25:1, or about 20:1.

In an embodiment, a method of making a polycrystalline diamond compact comprises mixing a diamond particle feed with a binder to form a mixture, forming the mixture into a pre-compact, heating the pre-compact in a non-oxidizing atmosphere to substantially drive off the binder, oxidizing the pre-compact in an oxidizing atmosphere at a temperature and for a time sufficient to burn off non-diamond carbon without over-oxidizing diamond; and sintering the pre-compact at high pressure and high temperature to form a polycrystalline diamond compact. In an aspect, a polycrystalline diamond compact encompassed herein is characterized in that the ratio of oxygen to nitrogen for the polycrystalline diamond compact, in parts per million, is at a ratio set forth above, e.g., at least 1.2:1.

For the purposes of this disclosure, the term "about" means plus or minus 10% of the values referenced. For example, "about 10" is understood to mean 10 and 9 to 11.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

In various embodiments, the results of methods disclosed and encompassed herein are polycrystalline diamond compacts having improved wear characteristics, among other properties.

Example 1

FIG. 1 is a graphical comparison of the Raman scattering peaks of several diamond particle feeds and pre-compacts. To facilitate discussion of the graph, the spectra lines and peaks have been numbered sequentially from 1-15 from the highest count peak to the lowest count peak.

Spectra lines 4, 5, and 8 represent samples of unfired diamond particles. Spectra 6, 12, and 13 represent samples of fired diamond particles that have been heated in a hydrogen atmosphere. Spectra 1, 7, and 10 represent samples of fired diamond particles that were subsequently burned or oxidized. Spectra 11, 14, and 15 represent samples of pre-compacts that have been fired to remove the binder. Spectra 2, 3, and 9 represent samples of fired pre-compacts that were subsequently burned or oxidized. The weight loss from oxidation of the non-diamond carbon ranged from about 1 percent to about 2.25 percent.

Example 2

Figure 2:
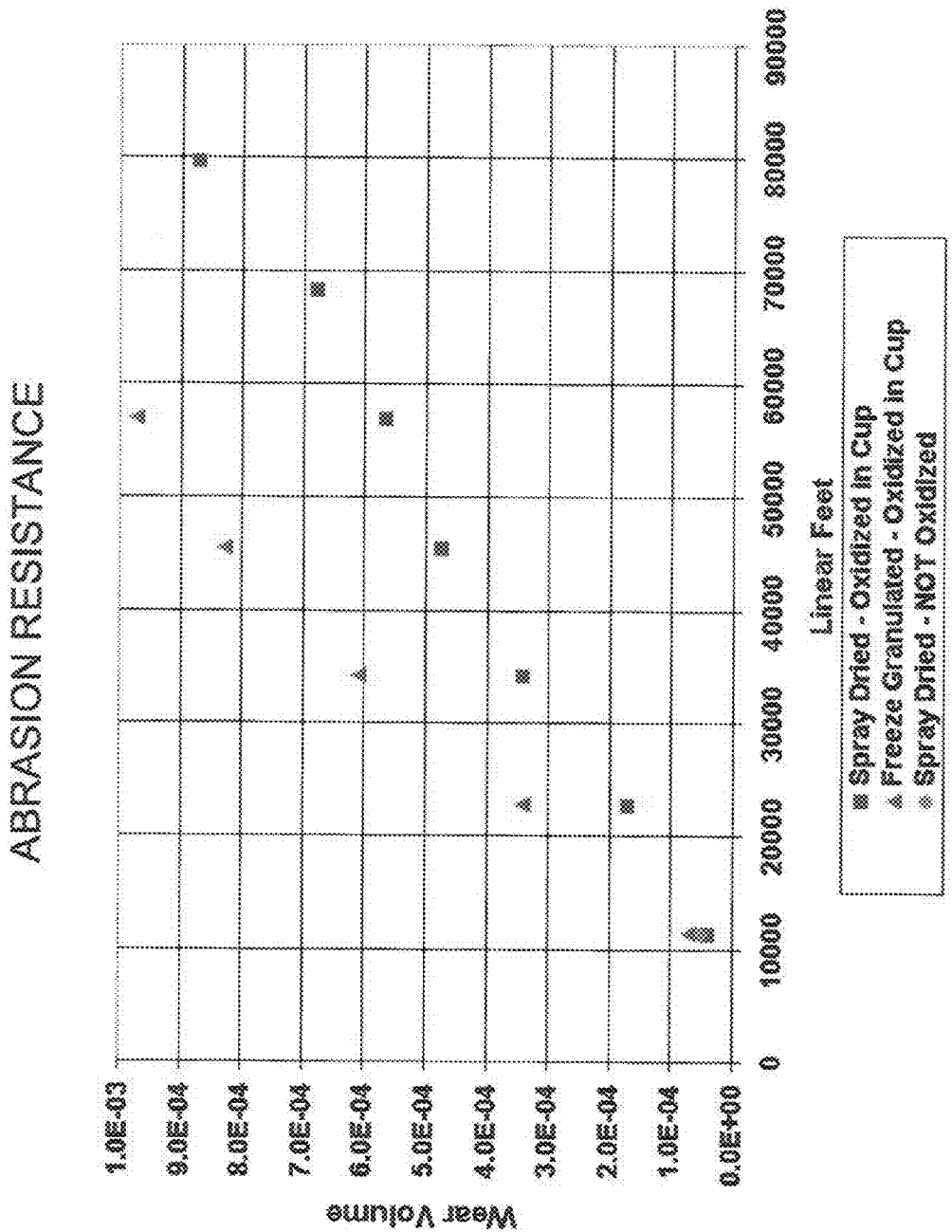
FIG. 2 is graph comparing the abrasion test results of compacts made from pre-compacts that were spray-dried but not oxidized, spray-dried and oxidized in a cup, and freeze-granulated and oxidized in a cup.

FIG. 2 shows a comparison of abrasion resistance data for three samples of PCD compacts. Data for each sample was recorded until the sample chipped. The circular data point represents a PCD compact made from spray-dried diamond particle feed in which the pre-compact was not oxidized. This compact chipped prior to the second data point being recorded. The poor performance of the non-oxidized spray-dried sample was likely due to difficulties in obtaining the desired sintering quality; many samples that were not oxidized barely survived pressing in the HPHT cell, and those that did survive had far worse abrasive wear and toughness characteristics than their oxidized counterparts.

The square data points represent a PCD compact made from freeze-granulated diamond particle feed in which the pre-compact was oxidized in the cup. The triangular data points represent a PCD compact made from spray-dried diamond particle feed in which the pre-compact was oxidized in the cup. Comparing the data, at the first measurement point (approximately 11,000 linear feet of abrasive contact) the wear volume of the three samples is similar, with the freeze-granulated oxidized sample performing slightly worse than the spray-dried non-oxidized sample, and the spray-dried oxidized sample performing slightly better. After further abrasive contact, the oxidized sample made from spray-dried diamond particles significantly outperformed the oxidized sample made from freeze-granulated diamond particles, to the extent that the spray-dried oxidized sample was usable for about 25% more abrasive contact than the freeze-granulated oxidized sample. It is noted that other known granulating techniques may be used.

Example 3

Figure 3:
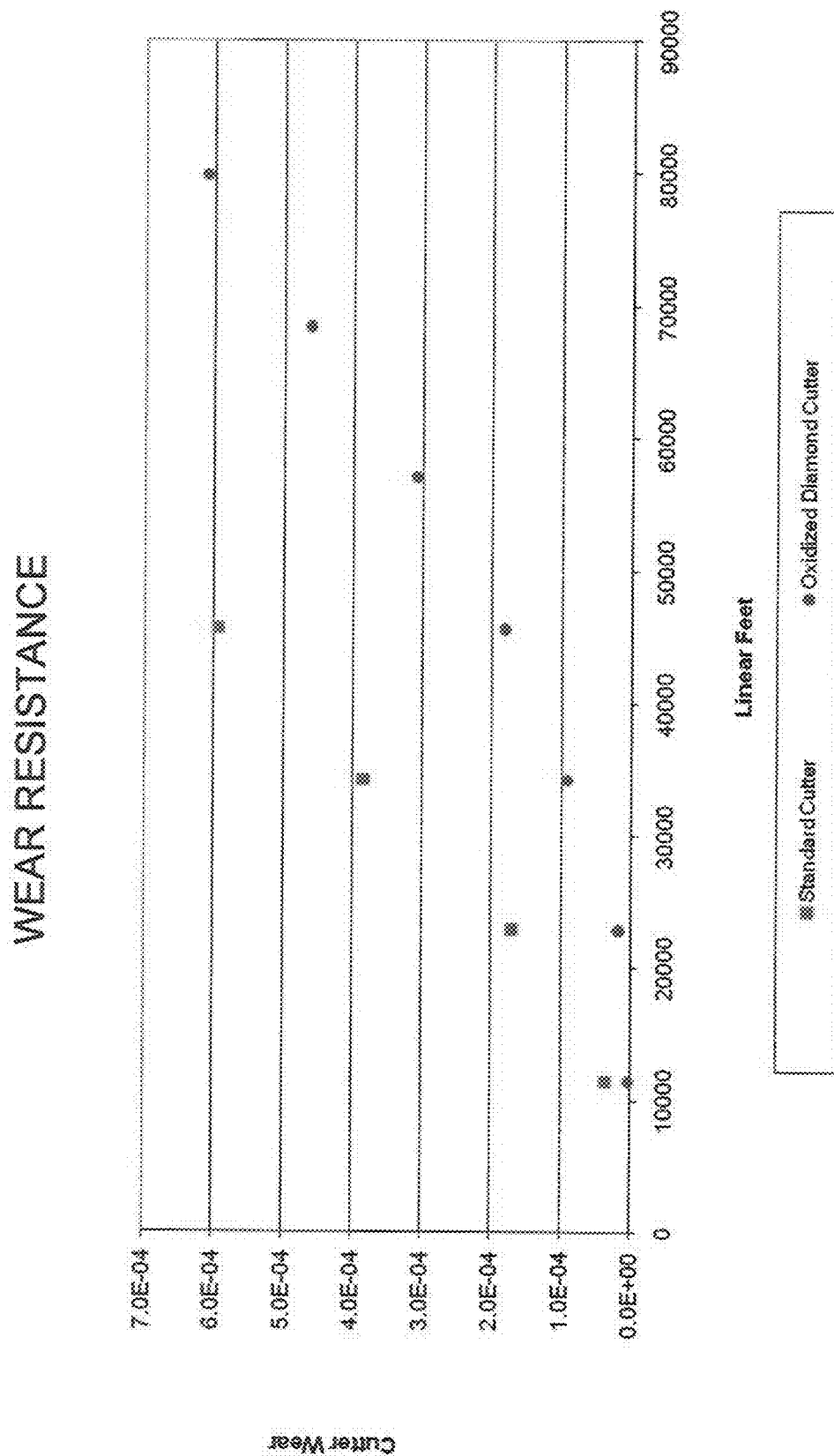
FIG. 3 is a graph comparing the wear test results of a compact made from a diamond feed subjected to burning or oxidation and a standard compact made from diamond feed not subjected to burning or oxidation.

FIG. 3 shows a comparison of wear resistance between a standard cutter made from a non-oxidized cup assembly and an oxidized diamond cutter made from an oxidized cup assembly, wherein each cup assembly included diamond in a refractory metal container with a substrate covering the diamond bed. As shown, the oxidized diamond cutter exhibited far less wear for the same amount of usage as compared with the standard cutter. Specifically, the wear on the oxidized cutter was only about 10% of the wear on the standard cutter after 20,000 linear feet of abrasion, and only about 30% of the wear on the standard cutter after 45,000 linear feet of abrasion. Additionally, the oxidized diamond cutter was able to perform nearly twice as long as its non-oxidized counterpart before failure.

Example 4

Table 1 illustrates the differences in nitrogen and oxygen content of polycrystalline diamond compacts undergoing different treatments prior to high pressure, high temperature treatment. In general, it is shown that oxygen content increases and nitrogen content decreases for PCD compact prepared from pre-compacts that have undergone oxidation treatments to remove non-diamond carbon. As shown in Table 1, in a non-oxidized PCD compact, the ratio of oxygen to nitrogen is low, e.g., less than 1.2:1. In accordance with the disclosure encompassed herein, after treatment in an oxidizing environment as described herein, the ratio of oxygen to nitrogen in a PCD compact increases substantially.

TABLE 1

Results of PCD compact with Different Treatment Prior to HPHT.

|  | Nitrogen (ppm) | Oxygen (ppm) |  |
| --- | --- | --- | --- |
| Non-Oxidized | 143 | 171 |  |
|  | 1083 | 738 |  |
|  | 203 | 197 |  |
|  | 850 | 299 |  |
|  | 151 | 165 |  |
|  | 486 | 314 | Average |
| Oxidized | 103 | 222 |  |
|  | 153 | 590 |  |
|  | 432 | 8318 |  |
|  | 112 | 196 |  |
|  | 117 | 406 |  |
|  | 183.4 | 1946.4 | Average |

Example 5

Table 2 describes the percent weight of nitrogen and oxygen in samples of diamond feed that is oxidized after hydrogen firing (samples 4-6) versus samples of diamond feed after hydrogen firing but prior to oxidation (samples 1-3). Oxygen content is shown to increase in oxidized samples.

TABLE 2

FTIR Analysis of C—H Bonding in Oxidized Diamond Feed versus Non-Oxidized Diamond Feed

|  | 1 Hydrogen Fired | 2 Hydrogen Fired | 3 Hydrogen Fired | 4 Hydrogen Fired, Oxidized | 5 Hydrogen Fired, Oxidized | 6 Hydrogen Fired, Oxidized |
| --- | --- | --- | --- | --- | --- | --- |
| wt % N | 0.0128 | 0.0115 | 0.012 | 0.0113 | 0.0114 | 0.0133 |
| wt % O | 0.0215 | 0.0158 | 0.0178 | 0.0317 | 0.035 | 0.037 |

Figure 4:
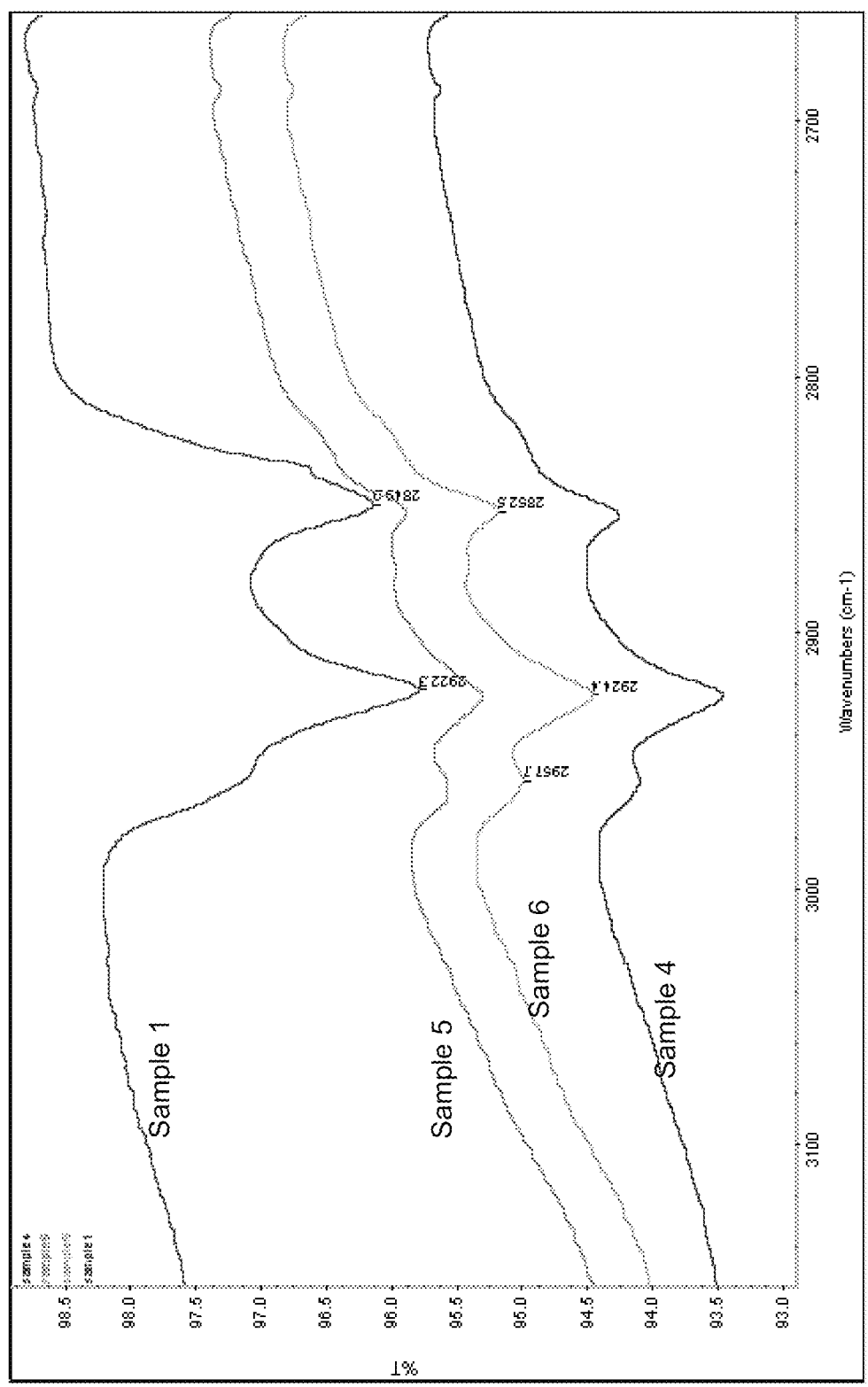
FIG. 4 is a Fourier transform infrared (FTIR) spectroscopic graph that shows a reduction in C—H bonding for diamond feed that is oxidized after hydrogen firing versus the sample diamond feed after hydrogen firing but prior to oxidation.

FIG. 4 is a Fourier transform infrared (FTIR) spectroscopic graph that shows a reduction in C—H bonding for diamond feed that is oxidized after hydrogen firing versus the sample diamond feed after hydrogen firing but prior to oxidation. Samples 1, 4, 5, and 6 from Table 2 are shown in FIG. 4. The top line in the graph is representative of a non-oxidized diamond feed. The bottom three lines in the graph are representative of samples 4, 6, and 5 from Table 2, in order from bottom to top. Differences among the oxidized samples may have arisen due to variations in the gap between the carbide substrate and the cup occurring during sample preparation.

Example 6

FIG. 5 is a Raman spectrum illustrating the difference between oxidized diamond feed (FIG. 5B) and non-oxidized diamond feed (FIG. 5A) prepared according to the methods encompassed herein, specifically showing a reduction in the 1580 cm$^{-1}$ peak ("graphite peak", non-diamond carbon) in the oxidized spectrum. Both spectra exhibit the 1320 cm$^{-1}$ peak for diamond. The spectra were generated using a 785 nm laser, though any wavelength excitatory light that is acceptable to use for diamond and graphite Raman spectroscopy would be acceptable.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modifications will be apparent to those skilled in the art, and may be made without departing from the spirit or scope of the disclosure.

Each and every reference disclosed herein is hereby incorporated by reference in its entirety.

We claim:

1. A method of making a polycrystalline diamond compact, comprising:
   mixing a diamond particle feed with a binder to form a mixture;
   forming the mixture into a pre-compact;
   heating the pre-compact in a non-oxidizing atmosphere to drive off at least a portion of the binder and to form non-diamond carbon from the binder;
   oxidizing the pre-compact in an oxidizing atmosphere at a temperature and for a time sufficient to burn off non-diamond carbon formed in the pre-compact heating step without over-oxidizing diamond; and
   sintering the pre-compact at high pressure and high temperature to form a polycrystalline diamond compact.

2. The method of claim 1, wherein the non-oxidizing atmosphere comprises hydrogen.

3. The method of claim 1, wherein the non-oxidizing atmosphere comprises argon.

4. The method of claim 1, wherein oxidizing atmosphere is air.

5. The method of claim 1, wherein oxidizing the pre-compact is performed at a temperature from about 500° C. to about 750° C. and for a time from about 10 minutes to about 240 minutes.

6. The method of claim 1, further comprising placing the pre-compact in a cup of a high pressure, high temperature apparatus prior to oxidizing the pre-compact.

7. The method of claim 1, further comprising oxidizing the diamond particle feed prior to mixing with the binder.

8. The method of claim 7, further comprising placing the diamond particle feed in a cup of a high pressure, high temperature apparatus prior to oxidizing the diamond particle feed.

9. A polycrystalline diamond compact having improved wear characteristics made by a process according to claim 1.

10. The method of claim 6, further comprising placing a substrate in the pre-compact assembly to enclose the pre-compact.

11. The method of claim 1, wherein the pre-compact retains sufficient strength and coherence after the heating step to be placed into a cup of a high pressure, high temperature apparatus.

* * * * *